United States Patent
Furukawa

(10) Patent No.: US 8,352,533 B2
(45) Date of Patent: Jan. 8, 2013

(54) SEMICONDUCTOR INTEGRATED CIRCUIT IN IN A CARRY COMPUTATION NETWORK HAVING A LOGIC BLOCKS WHICH ARE DYNAMICALLY RECONFIGURABLE

(75) Inventor: Hiroshi Furukawa, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 962 days.

(21) Appl. No.: 12/332,673

(22) Filed: Dec. 11, 2008

(65) Prior Publication Data

US 2009/0271461 A1 Oct. 29, 2009

(30) Foreign Application Priority Data

Apr. 25, 2008 (JP) .................................. 2008-115945

(51) Int. Cl.
*G06F 7/57* (2006.01)

(52) U.S. Cl. ........ 708/629; 708/190; 708/500; 708/501; 708/625

(58) Field of Classification Search .................. 708/501, 708/505, 190
See application file for complete search history.

(56) References Cited

U.S. PATENT DOCUMENTS

| | | | | |
|---|---|---|---|---|
| 5,257,218 A * | 10/1993 | Poon | | 708/712 |
| 5,944,772 A * | 8/1999 | Haas et al. | | 708/233 |
| 6,519,621 B1 * | 2/2003 | Yano | | 708/603 |
| 6,813,628 B2 * | 11/2004 | Bhushan et al. | | 708/671 |
| 7,089,277 B2 | 8/2006 | Uehara et al. | | |
| 7,490,119 B2 * | 2/2009 | Dhong et al. | | 708/505 |
| 7,627,625 B2 * | 12/2009 | Hubert | | 708/630 |
| 7,768,301 B2 * | 8/2010 | Lepape | | 326/41 |
| 7,774,580 B2 | 8/2010 | Saito et al. | | |
| 7,958,179 B2 * | 6/2011 | Lyuh et al. | | 708/490 |
| 8,099,540 B2 * | 1/2012 | Hanai et al. | | 710/317 |
| 8,150,903 B2 * | 4/2012 | Yang et al. | | 708/625 |
| 2003/0229660 A1 | 12/2003 | Uehara et al. | | |
| 2006/0004903 A1 * | 1/2006 | Admon | | 708/708 |
| 2006/0010306 A1 | 1/2006 | Saito et al. | | |
| 2008/0243976 A1 * | 10/2008 | Wiencke | | 708/230 |

FOREIGN PATENT DOCUMENTS

| | | |
|---|---|---|
| JP | 08-328828 A | 12/1996 |
| JP | 2004-13519 A | 1/2004 |
| JP | 2006-31127 A | 2/2006 |
| JP | 2006-244519 A | 9/2006 |

* cited by examiner

*Primary Examiner* — Tammara Peyton
(74) *Attorney, Agent, or Firm* — Arent Fox LLP

(57) ABSTRACT

There is provided a semiconductor integrated circuit including: a plurality of first logic blocks which are reconfigurable, the plurality of first logic blocks inputting data of a first bit width and performing computation; a first network connecting the plurality of first logic blocks in a dynamically reconfigurable manner; a plurality of second logic blocks inputting data of a second bit width different from the first bit width and performing computation; a second network connected to outputs of the plurality of second logic blocks; and a third network connecting a carry bit output of a computing unit included in the first logic block to an input of a computing unit included in the second logic block in a dynamically reconfigurable manner.

9 Claims, 9 Drawing Sheets

SEMICONDUCTOR INTEGRATED CIRCUIT IN IN A CARRY COMPUTATION NETWORK HAVING A LOGIC BLOCKS WHICH ARE DYNAMICALLY RECONFIGURABLE

CROSS-REFERENCE TO RELATED APPLICATIONS

This application is based upon and claims the benefit of priority of the prior Japanese Patent Application No. 2008-115945, filed on Apr. 25, 2008, the entire contents of which are incorporated herein by reference.

FIELD

The embodiments discussed herein are directed to a semiconductor integrated circuit.

BACKGROUND

A reconfigurable LSI (large scale semiconductor integrated circuit) is constituted with a large number of processor elements (PE) thereinside, and each processor element is constituted with a plurality of stages of an arithmetic element such as an ALU (Arithmetic Logic Unit) and a simple arithmetic element in a subsequent stage.

FIG. 12 is a diagram illustrating a configuration example of a processor element 1201 of a two-stage pipeline. Registers 1202 and 1203 hold 16-bit input data respectively. A register 1204 holds predetermined data. A selector 1205 selects and output data held in the register 1203 or the register 1204. A multiplier 1206 multiplies data held in the register 1202 and the output data of the selector 1205 together, and outputs 32-bit multiplication data. A register 1207 holds the output data of the multiplier 1206. A selector 1208 selects and outputs data held in the register 1204 or a register 1210. An ALU 1209 performs computation based on the data held in the register 1207 and the output data of the selector 1208, and outputs 32-bit computation data. The register 1210 holds output data of the ALU 1209 and outputs 16-bit or 32-bit data to the outside.

When the selector 1208 selects the data held in the register 1210 and the ALU 1209 performs addition, it means the ALU 1209 performs accumulative addition. In such a case, the ALU 1209 overflows due to accumulative addition, deteriorating bit accuracy.

FIG. 13 is a diagram illustrating a configuration example of a reconfigurable circuit using two processor elements 1201a and 1201b. The processor element 1201a has registers 1202 to 1204, 1207, a selector 1205 and a multiplier 1206 of a previous stage of the processor element 1201 in FIG. 12, and outputs data normalized to 16 bits to data network 1301. The processor element 1201b has a selector 1208, an ALU 1209 and a register 1210 of a subsequent stage of the processor element 1201 in FIG. 12, and further has registers 1302 to 1304, and inputs the output data of the processor element 1201a via the data network 1301. In this case, since the processor element 1201a outputs the data normalized to 16 bits to the data network 1301, bit accuracy of the data is deteriorated.

As described above, in accumulative addition (ACC) and multiply-and-accumulation (MAC), accumulative addition/deduction is performed, so that a large bit number is necessary. When the bit number is small, normalization is performed for every computation, and calculation of an accumulative error or accurate bit accuracy becomes necessary.

FIG. 14 is a diagram illustrating a configuration example of a reconfigurable circuit in which bit accuracy is improved by using two processor elements 1401 and 1402. The processor elements 1401 and 1402 have registers 1202, 1203, 1207, 1210, a multiplier 1206 and an ALU 1209 respectively, similarly to the processor element 1201 in FIG. 12. The ALU 1209 in the processor element 1401 performs accumulative addition, outputs 16-bit or 32-bit data to a data network 1403, and outputs 1-bit carry data to the ALU 1209 in the processor element 1402. The ALU 1209 in the processor element 1402 adds that carry data and data held in the register 1210 and outputs 16-bit or 32-bit data to the data network 1403. Thereby, bit accuracy can be improved. However, since the processor element 1402 is necessary for carry computation in addition to the processor element 1401, there is a problem that a resource is wasted due to twice the number of processor elements.

In following Patent Document 1, there is described a signal processor which has: a plurality of processor elements having an input register in an input section of a computing unit and having an output register in an output section of the computing unit; a bus connecting the plurality of processor elements; a switch section altering connection of the bus; and a control circuit controlling the switch section in correspondence with software, the signal processor including: a first operation mode in which the processor element continually performs signal processings; and a second operation mode in which a signal processing by the processor element and a data transfer processing from the output register to the input register of the processor element are performed alternately and connection between the plurality of processor elements are altered in a signal processing period by the processor element.

In following Patent Document 2, there is described a multiplier accumulator which has a CSA (Carry Save Adder) tree and performs fixed point multiply-and-accumulation.

[Patent Document 1] Japanese Laid-open Patent Publication No. 2006-244519
[Patent Document 2] Japanese Laid-open Patent Publication No. 08-328828

When accumulative addition or multiply-and-accumulation is performed, a large bit number is necessary, so that bit accuracy is deteriorated in a processor element with small bit number. Usage of a plurality of processor elements in order to improve bit accuracy leads to a wasteful resource, and usage efficiency of the resource is reduced.

SUMMARY

According to an aspect of the embodiment, there is provided a semiconductor integrated circuit including: a plurality of first logic blocks which are reconfigurable, the plurality of first logic blocks inputting data of a first bit width and performing computation; a first network connecting the plurality of first logic blocks in a dynamically reconfigurable manner; a plurality of second logic blocks inputting data of a second bit width different from the first bit width and performing computation; a second network connected to outputs of the plurality of second logic blocks; and a third network connecting a carry bit output of a computing unit included in the first logic block to an input of a computing unit included in the second logic block in a dynamically reconfigurable manner.

Additional objects and advantages of the embodiment will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENTS

Figure 1:
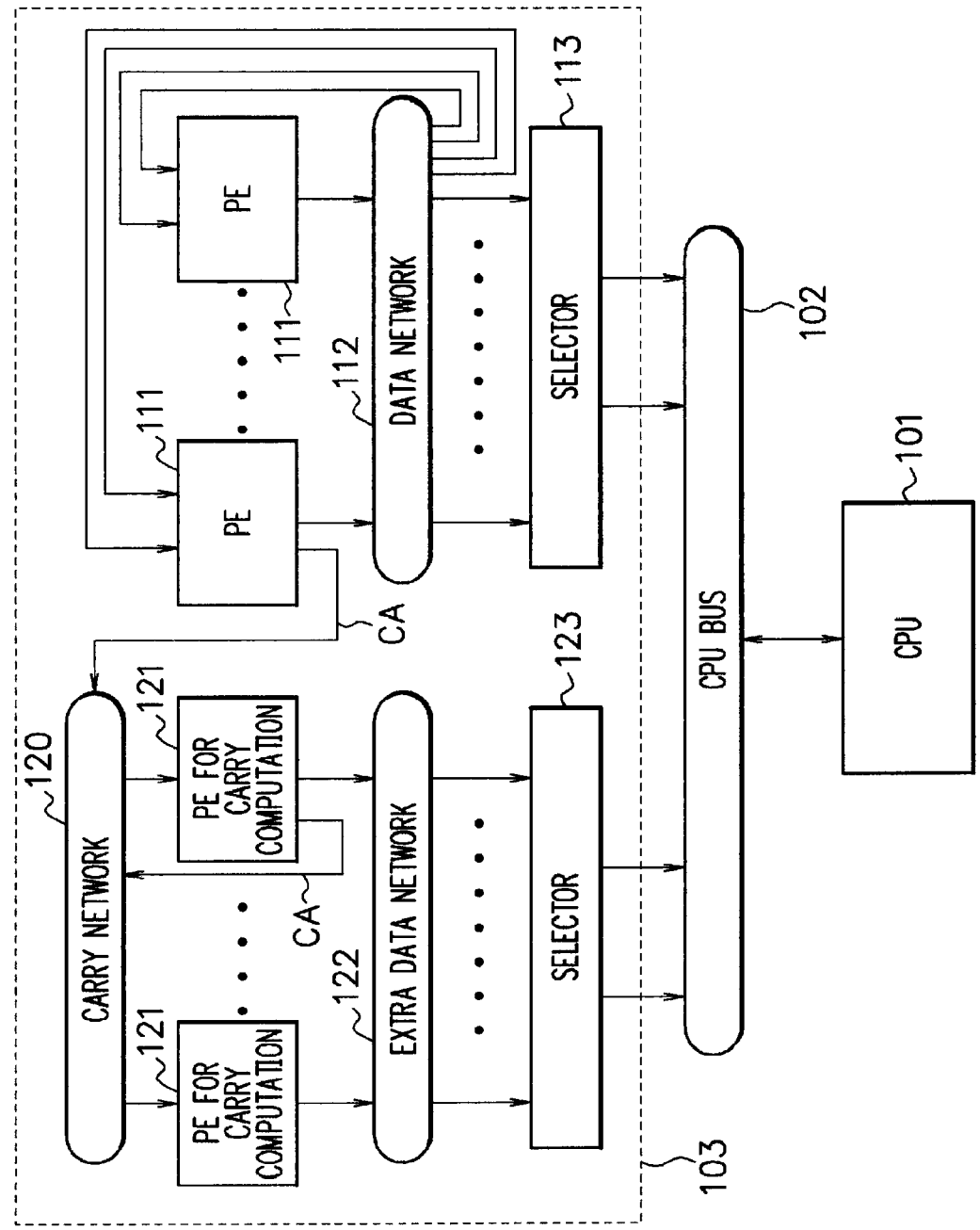
FIG. 1 is a diagram illustrating a configuration example of a semiconductor integrated circuit having a reconfigurable circuit according to an embodiment.

FIG. 1 is a diagram illustrating a configuration example of a semiconductor integrated circuit having a reconfigurable circuit 103 according to an embodiment. The semiconductor integrated circuit has a CPU (Central Processing Unit) 101, a CPU bus 102 and the reconfigurable circuit 103. The reconfigurable circuit 103 has a plurality of processor elements (PEs) 111, a data network 112, a selector 113, a carry network 120, a plurality of processor elements 121 for carry computation, an extra data network 122, and a selector 123.

The CPU 101 and the reconfigurable circuit 103 are connected to the CPU bus 102. The selector 113 selects data outputted by the data network 112 and outputs to the CPU bus 102. The selector 123 selects data outputted by the extra data network 122 and outputs to the CPU bus 102. The CPU 101 inputs data selected by the selectors 113 and 123 via the CPU bus 102.

Figure 2:
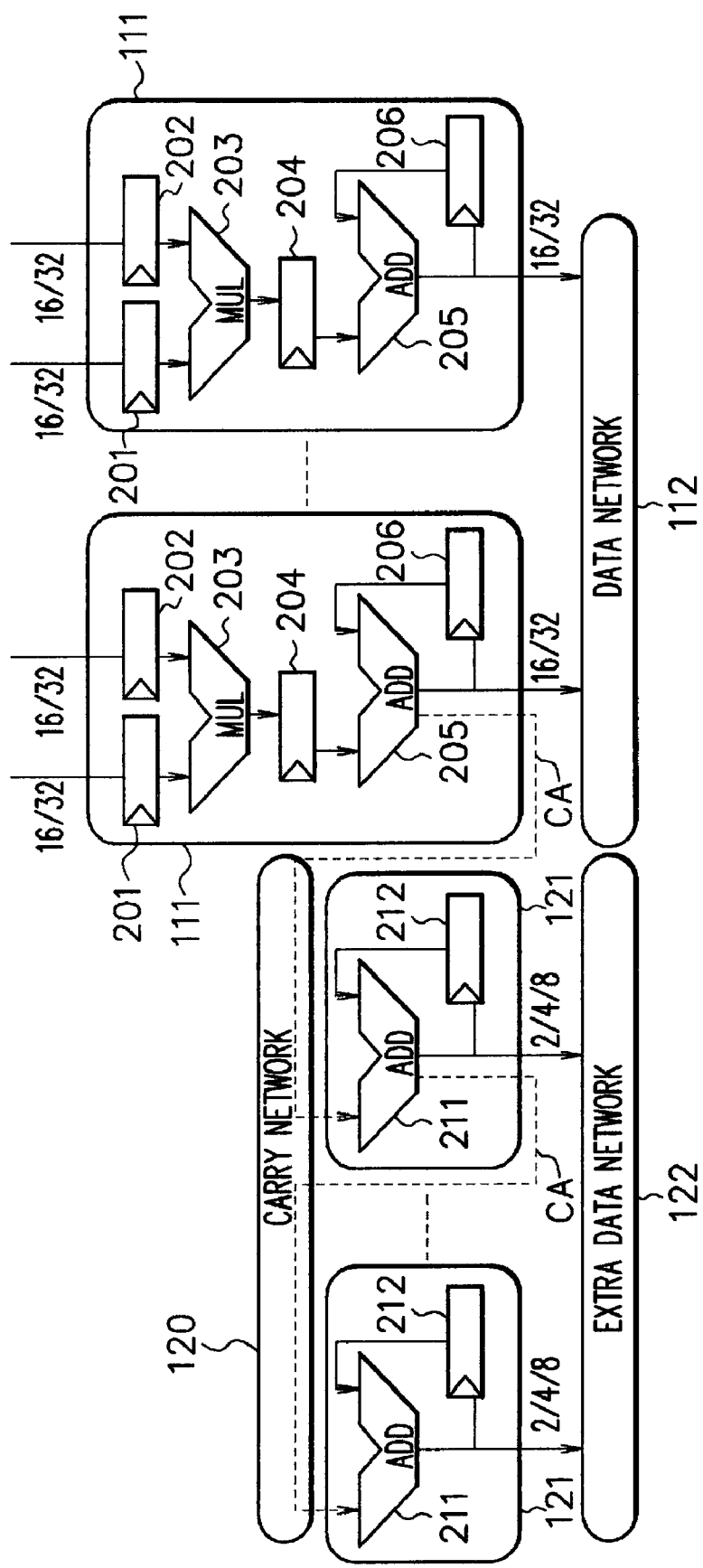
FIG. 2 is a diagram illustrating a configuration example of a processor element in FIG. 1 and a processor element for carry computation.

FIG. 2 is a diagram illustrating a configuration example of the processor element 111 and the processor element 121 for carry computation in FIG. 1. The processor element 111 is a first logic block which is reconfigurable, the first logic block inputting data of a first bit width (16 bits or 32 bits) and performing computation, and the processor element 111 outputs data of the first bit width to the data network 112 and outputs carry data CA of, for example, 1 bit, to the carry network 120. The data network 112 is a first network which connects the plural processor elements 111 in a dynamically reconfigurable manner. The data network 112 has a switch (selector) which switches connection between outputs of the plural processor elements 111 and inputs of the plural processor elements 111, for example, by control of the CPU 101. The processor element 121 for carry computation inputs carry data CA of a second bit width (for example, 1 bit) different from the first bit width from the carry network 120 and performs computation. The extra data network 122 is a second network connected to outputs of the plural processor elements 121 for carry computation. The carry network 120 connects an output of carry bit CA of an adder (accumulative adder or computing unit) 205 included in the processor element 111 to an input of an adder (accumulative adder or computing unit) 211 included in the processor element 121 for carry computation in a dynamically reconfigurable manner. The processor element 111, the processor element 121 for carry computation, the data network 112, the carry network 120 and the extra data network 122 can be reconfigured, for example, by control of the CPU 101.

The processor element 111 has registers 201, 202, 204, 206, a multiplier 203, and the adder 205. The adder 205 and the register 206 constitute an accumulative adder. The registers 201 and 202 input and hold data of the first bit width (16 bits or 32 bits) from the data network 112 respectively. The multiplier 203 multiplies the data (for example, of 16 bits) held in the registers 201 and 202 together and outputs multiplication data (for example, of 32 bits). The register 204 holds the output data of the multiplier 203. The adder 205 is originally an ALU and is reconfigured to the adder, for example, by control of the CPU 101. The adder 205 adds the data held in the registers 204 and 206, outputs addition data (for example, of 32 bits) to the register 206 and the data network 112, and outputs carry data (for example, of 1 bit) CA to the carry network 120. The register 206 holds the addition data outputted by the adder 205. The adder 205 and the register 206 constitute the accumulative adder and perform accumulative addition. As a result, the adder 205 outputs the carry data CA in addition to the addition data, for example, of 32 bits. Since the processor element 111 performs accumulative addition and multiply-and-accumulation as above, the carry data CA occurs.

The processor element 121 for carry computation is an accumulative adder having an adder 211 and a register 212. The adder 211 is originally an ALU and is reconfigured, for example, by control of the CPU 101. The adder 211 adds carry data CA inputted from the carry network 120 and data held in the register 212, outputs 2-bit, 4-bit or 8-bit addition data to the register 212 and the extra data network 122, and outputs carry data (for example, of 1 bit) CA to the carry network 120. The register 212 holds the addition data outputted by the adder 211.

The processor element 121 for first-stage carry computation inputs the carry data CA outputted by the processor element 111 via the carry network 120, and accumulatively adds that carry data CA. The processor element 121 for second-stage carry computation inputs the carry data CA outputted by the processor element 121 for first-stage carry computation via the carry network 120, and accumulatively adds that carry data CA. Similarly, the processor element 121 for n-th stage carry computation inputs carry data CA outputted by the processor element 121 for (n−1)th stage carry computation via the carry network 120, and accumulatively adds that carry data CA.

Figure 3:
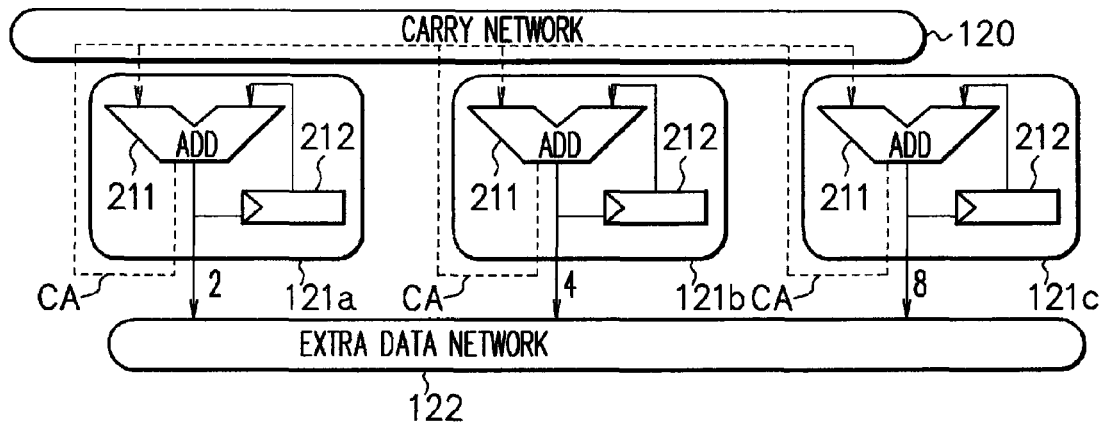
FIG. 3 is a diagram illustrating a configuration example of a plurality of the processor elements for carry computation in FIG. 2.

FIG. 3 is a diagram illustrating a configuration example of a plurality of the processor elements 121 for carry computation in FIG. 2. Three processor elements 121a, 121b and 121c for carry computation correspond to three processor elements 121 for carry computation in FIG. 2. The processor element 121a for carry computation inputs carry data (for example, of 1 bit) CA from the carry network 120 and performs accumulative addition, outputting 2-bit accumulatively added data to an extra data network 122 and outputting carry data (for example, of 1 bit) CA to a carry network 120. The processor element 121b for carry computation inputs carry data (for example, of 1 bit) CA from the carry network 120 and performs accumulative addition, outputting 4-bit accumulatively added data to the extra data network 122 and outputting carry data (for example, of 1 bit) CA to the carry network 120. The processor element 121c for carry computation inputs carry data (for example, of 1 bit) CA from the carry network 120 and performs accumulative addition, outputting 8-bit accumulatively added data to the extra data network 122, and outputs carry data (for example, of 1 bit) CA to the carry network 120.

Bit widths of the output data of the processor elements 121a to 121c for carry computation are, for example, 2 bits, 4 bits and 8 bits, which are ⅛, ¼ or half of a bit width of the output data (for example, of 16 bits) of the processor element 111.

As described above, the plural processor elements 121 for carry computation have the processor element 121a for 2-bit carry computation, the processor element 121b for 4-bit carry computation, and the processor element 121c for 8-bit carry computation. By combining output data of the three processor elements 121a to 121c for carry computation, all carry computation of from 1 bit to 15 bits can be performed. Connections in the carry network 120 and the extra data network 122 are reconfigurable, for example, by the CPU 101. Hereinafter, details thereof will be described.

(Carry Computation of 1 Bit)

To perform 1-bit carry computation in relation to the processor element 111, it suffices to use carry data CA outputted by the adder 205 in the processor element 111.

(Carry Computation of 2 Bits)

To perform 2-bit carry computation in relation to the processor element 111, it suffices to use 2-bit accumulatively added data outputted by the processor element 121a for 2-bit carry computation. In such a case, the processor element 121a for 2-bit carry computation inputs carry data CA outputted by the processor element 111 and performs accumulative addition.

(Carry Computation of 3 Bits)

To perform 3-bit carry computation in relation to the processor element 111, it suffices to use 2-bit accumulatively added data and 1-bit carry data CA outputted by the processor element 121a for 2-bit carry computation. In such a case, the processor element 121a for 2-bit carry computation inputs carry data CA outputted by the processor element 111 and performs accumulative addition.

(Carry Computation of 4 Bits)

To perform 4-bit carry computation in relation to the processor element 111, it suffices to use 4-bit accumulatively added data outputted by the processor element 121b for 4-bit carry computation. In such a case, the processor element 121b for 4-bit carry computation inputs carry data CA outputted by the processor element 111 and performs accumulative addition.

(Carry Computation of 5 Bits)

To perform 5-bit carry computation in relation to the processor element 111, it suffices to use 4-bit accumulatively added data and 1-bit carry data CA outputted by the processor element 121b for 4-bit carry computation. In such a case, the processor element 121b for 4-bit carry computation inputs carry data CA outputted by the processor element 111 and performs accumulative addition.

(Carry Computation of 6 Bits)

Figure 4:
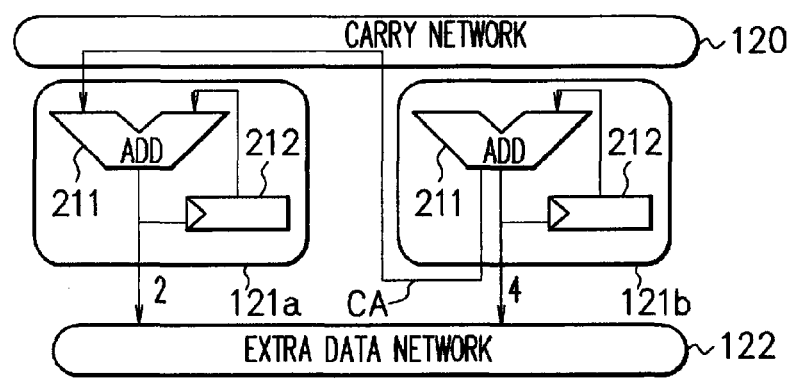
FIG. 4 is a diagram illustrating a configuration example of a processor element for carry computation to perform 6-bit carry computation.

FIG. 4 is a diagram illustrating a configuration example of a processor element for carry computation to perform 6-bit carry computation. A plurality of processor elements 121 for carry computation has a processor element 121a for 2-bit carry computation and a processor element 121b for 4-bit carry computation. The processor element 121b for 4-bit carry computation inputs carry data CA outputted by a processor element 111 and performs accumulative addition, outputting 4-bit accumulatively added data to an extra data network 122 and outputting 1-bit carry data CA to a carry network 120. The processor element 121a for 2-bit carry computation inputs the carry data CA outputted by the processor element 121b for 4-bit carry computation via the carry network 120 and performs accumulative addition, and outputs 2-bit accumulatively added data to the extra data network 122. To perform 6-bit carry computation in relation to the processor element 111, it suffices to use the 4-bit accumulatively added data outputted by the processor element 121b for 4-bit carry computation and the 2-bit accumulatively added data outputted by the processor element 121a for 2-bit carry computation.

(Carry Computation of 7 Bits)

Figure 5:
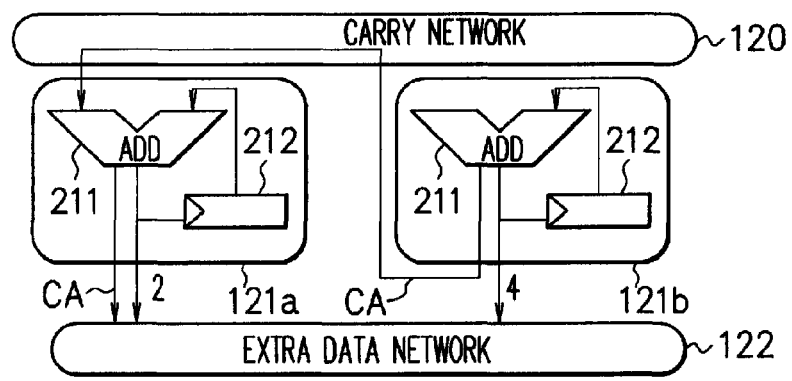
FIG. 5 is a diagram illustrating a configuration example of a processor element for carry computation to perform 7-bit carry computation.

FIG. 5 is a diagram illustrating a configuration example of a processor element for carry computation to perform 7-bit carry computation. A plurality of processor elements 121 for carry computation has a processor element 121a for 2-bit carry computation and a processor element 121b for 4-bit carry computation. The processor element 121b for 4-bit carry computation inputs carry data CA outputted by a processor element 111 and performs accumulative addition, outputting 4-bit accumulatively added data to an extra data network 122 and outputting 1-bit carry data CA to a carry network 120. The processor element 121a for 2-bit carry computation inputs the carry data CA outputted by the processor element 121b for 4-bit carry computation via the carry network 120 and performs accumulative addition, outputting 2-bit accumulatively added data and 1-bit carry data CA to the extra data network 122. To perform 7-bit carry computation in relation to the processor element 111, it suffices to use the 4-bit accumulatively added data outputted by the processor element 121b for 4-bit carry computation, and the 2-bit accumulatively added data and 1-bit carry data CA outputted by the processor element 121a for 2-bit carry computation.

(Carry Computation of 8 Bits)

To perform 8-bit carry computation in relation to a processor element 111, it suffices to use 8-bit accumulatively added data outputted by a processor element 121c for 8-bit carry computation. In such a case, the processor element 121c for 8-bit carry computation inputs carry data CA outputted by the processor 111 and performs accumulative addition.

(Carry Computation of 9 Bits)

To perform 9-bit carry computation in relation to a processor element 111, it suffices to use 8-bit accumulatively added data and 1-bit carry data CA outputted by a processor element 121c for 8-bit carry computation. In such a case, the processor element 121c for 8-bit carry computation inputs carry data CA outputted by the processor 111 and performs accumulative addition.

(Carry Computation of 10 Bits)

Figure 6:
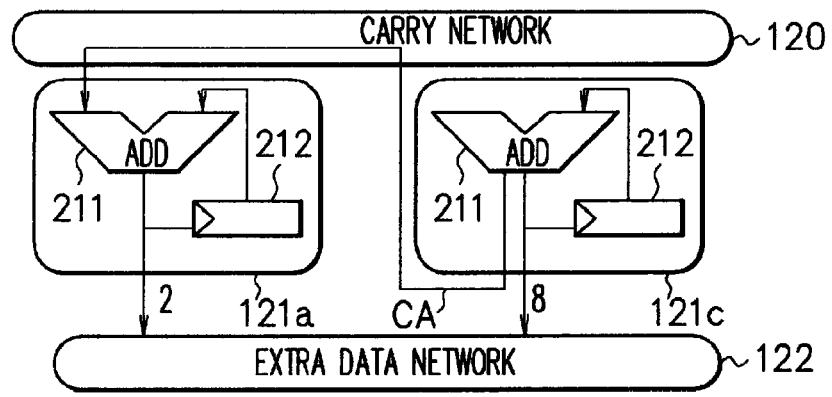
FIG. 6 is a diagram illustrating a configuration example of a processor element for carry computation to perform 10-bit carry computation.

FIG. 6 is a diagram illustrating a configuration example of a processor element for carry computation to perform 10-bit carry computation. A plurality of processor elements 121 for carry computation has a processor element 121a for 2-bit carry computation and a processor element 121c for 8-bit carry computation. The processor element 121c for 8-bit carry computation inputs carry data CA outputted by a processor element 111 and performs accumulative addition, outputting 8-bit accumulatively added data to an extra data network 122 and outputting 1-bit carry data CA to a carry network 120. The processor element 121a for 2-bit carry computation inputs the carry data CA outputted by the processor element 121c for 8-bit carry computation via the carry network 120 and performs accumulative addition, outputting 2-bit accumulatively added data to the extra data network 122. To perform 10-bit carry computation in relation to the processor element 111, it suffices to use the 8-bit accumulatively added data outputted by the processor element 121c for 8-bit carry computation and the 2-bit accumulatively added data outputted by the processor element 121a for 2-bit carry computation.

(Carry Computation of 11 Bits)

Figure 7:
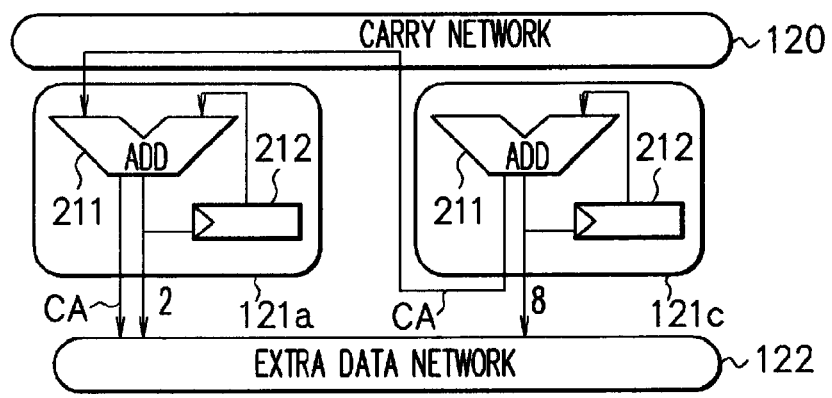
FIG. 7 is a diagram illustrating a configuration example of a processor element for carry computation to perform 11-bit carry computation.

FIG. 7 is a diagram illustrating a configuration example of a processor element for carry computation to perform 11-bit carry computation. A plurality of processor elements 121 for carry computation has a processor element 121a for 2-bit carry computation and a processor element 121c for 8-bit carry computation. The processor element 121c for 8-bit carry computation inputs carry data CA outputted by a processor element 111 and performs accumulative addition, outputting 8-bit accumulatively added data to an extra data network 122 and outputting 1-bit carry data CA to a carry network 120. The processor element 121a for 2-bit carry computation inputs the carry data CA outputted by the processor element 121c for 8-bit carry computation via the carry network 120 and performs accumulative addition, outputting 2-bit accumulatively added data and 1-bit carry data CA to the extra data network 122. To perform 11-bit carry computation in relation to the processor element 111, it suffices to use the 8-bit accumulatively added data outputted by the processor element 121c for 8-bit carry computation, and the 2-bit accumulatively added data and 1-bit carry data CA outputted by the processor element 121a for 2-bit carry computation.

(Carry Computation of 12 Bits)

Figure 8:
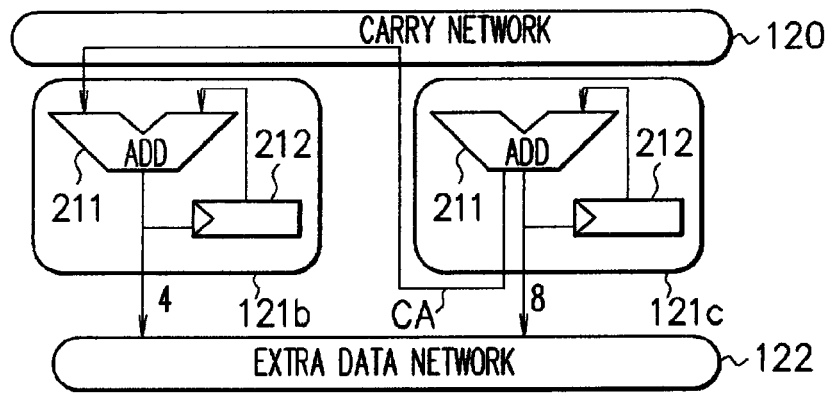
FIG. 8 is a diagram illustrating a configuration example of a processor element for carry computation to perform 12-bit carry computation.

FIG. 8 is a diagram illustrating a configuration example of a processor element for carry computation to perform 12-bit carry computation. A plurality of processor elements 121 for carry computation has a processor element 121b for 4-bit carry computation and a processor element 121c for 8-bit carry computation. The processor element 121c for 8-bit carry computation inputs carry data CA outputted by a processor element 111 and performs accumulative addition, outputting 8-bit accumulatively added data to an extra data network 122 and outputting 1-bit carry data CA to a carry network 120. The processor element 121b for 4-bit carry computation inputs the carry data CA outputted by the processor element 121c for 8-bit carry computation via the carry network 120 and performs accumulative addition, outputting 4-bit accumulatively added data to the extra data network 122. To perform 12-bit carry computation in relation to the processor element 111, it suffices to use the 8-bit accumulatively added data outputted by the processor element 121c for 8-bit carry computation and the 4-bit accumulatively added data outputted by the processor element 121b for 4-bit carry computation.

(Carry Computation of 13 Bits)

Figure 9:
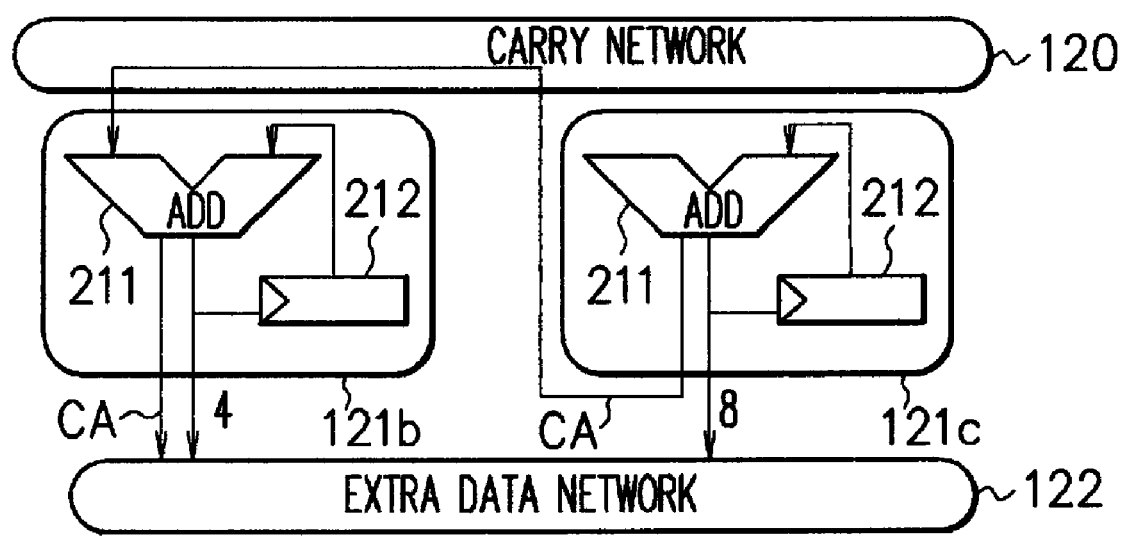
FIG. 9 is a diagram illustrating a configuration example of a processor element for carry computation to perform 13-bit carry computation.

FIG. 9 is a diagram illustrating a configuration example of a processor element for carry computation to perform 13-bit carry computation. A plurality of processor elements 121 for carry computation has a processor element 121b for 4-bit carry computation and a processor element 121c for 8-bit carry computation. The processor element 121c for 8-bit carry computation inputs carry data CA outputted by a processor element 111 and performs accumulative addition, outputting 8-bit accumulatively added data to an extra data network 122 and outputting 1-bit carry data CA to a carry network 120. The processor element 121b for 4-bit carry computation inputs the carry data CA outputted by the processor element 121c for 8-bit carry computation via the carry network 120 and performs accumulative addition, outputting 4-bit accumulatively added data and 1-bit carry data CA to the extra data network 122. To perform 13-bit carry computation in relation to the processor element 111, it suffices to use the 8-bit accumulatively added data outputted by the processor element 121c for 8-bit carry computation, and the 4-bit accumulatively added data and 1-bit carry data CA outputted by the processor element 121b for 4-bit carry computation.

(Carry Computation of 14 Bits)

To perform 14-bit carry computation in relation to a processor element 111, it suffices to use 8-bit accumulatively added data outputted by a processor element 121c for 8-bit carry computation, 4-bit accumulatively added data outputted by a processor element 121b for 4-bit carry computation, and 2-bit accumulatively added data outputted by a processor element 121a for 2-bit carry computation. In such a case, the processor element 121c for 8-bit carry computation inputs carry data CA outputted by a processor element 111 and performs accumulative addition. The processor element 121b for 4-bit carry computation inputs carry data CA outputted by the processor element 121c for 8-bit carry computation and performs accumulative addition. The processor element 121a for 2-bit carry computation inputs carry data CA outputted by the processor element 121b for 4-bit carry computation and performs accumulative addition.

(Carry Computation of 15 Bits)

To perform 15-bit carry computation in relation to a processor element 111, it suffices to use 8-bit accumulatively added data outputted by a processor element 121c for 8-bit carry computation, 4-bit accumulatively added data outputted by a processor element 121b for 4-bit carry computation, and 2-bit accumulatively added data and 1-bit carry data CA outputted by a processor element 121a for 2-bit carry computation. In such a case, the processor element 121c for 8-bit carry computation inputs carry data CA outputted by the processor element 111 and performs accumulative addition. The processor element 121b for 4-bit carry computation inputs carry data CA outputted by the processor element 121c for 8-bit carry computation and performs accumulative addition. The processor element 121a for 2-bit carry computation inputs carry data CA outputted by the processor element 121b for 4-bit carry computation and performs accumulative addition.

Figure 10:
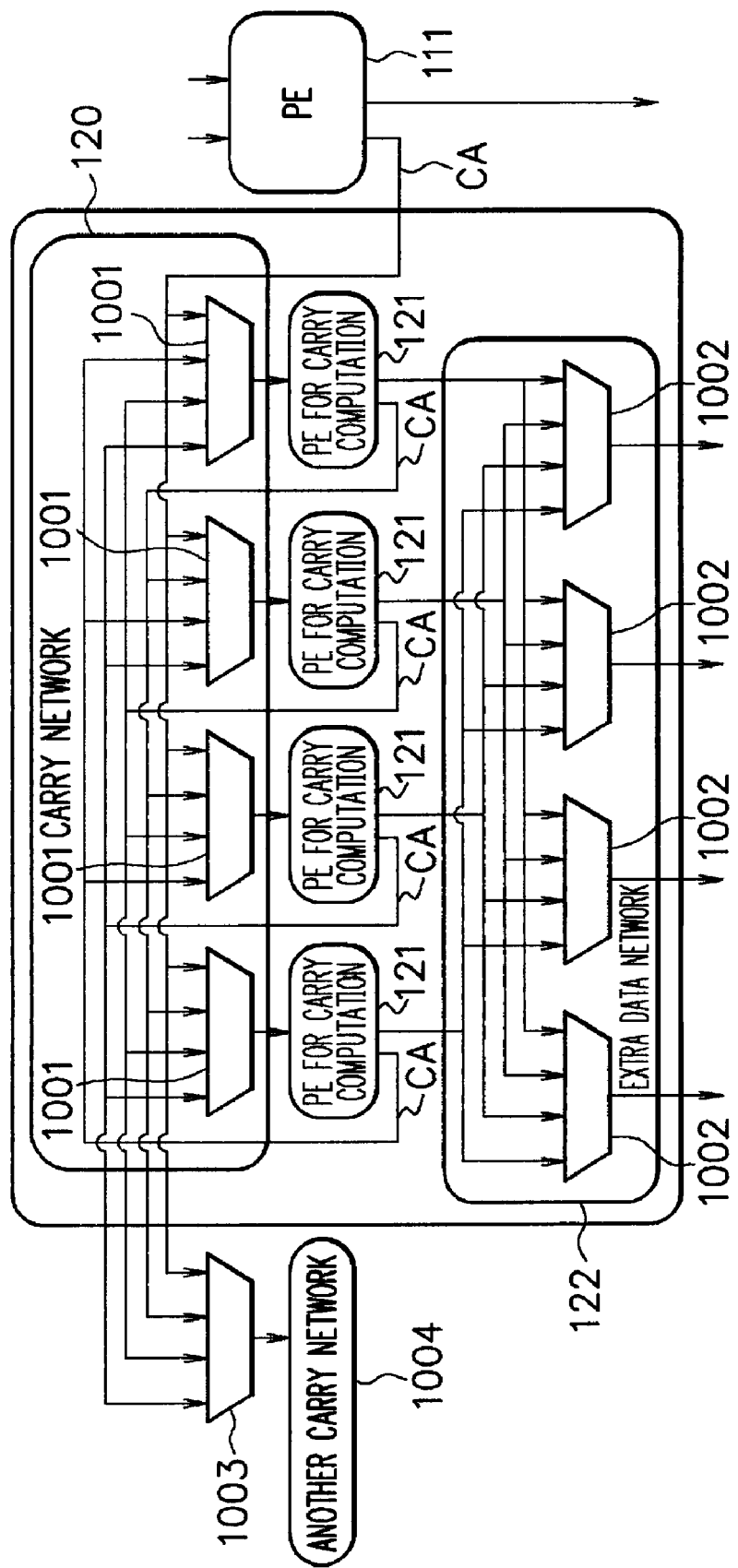
FIG. 10 is a diagram illustrating a configuration example of a carry network and an extra data network.

FIG. 10 is a diagram illustrating a configuration example of a carry network 120 and an extra data network 122. The carry network 120 has a plurality of selectors 1001. The plural selectors 1001 select any one of carry data CA outputted by a processor element 111 and carry data CA outputted by a plurality of processor elements 121 for carry computation respectively, and output to the plural processor elements 121 for carry computation. A selector 1003 selects any one of the carry data CA outputted by the processor element 111 and the carry data CA outputted by the plural processor elements 121 for carry computation, and outputs to another carry network 1004. An extra data network 122 has a plurality of selectors 1002. The plural selectors 1002 select any one of accumulatively added data outputted by the plural processor elements 121 for carry computation respectively, and output to the selector 123 (FIG. 1). The selectors 1001 to 1003 are controlled, for example, by a CPU 101.

The carry network 120 connects a carry bit output of an adder (accumulative adder or computing unit) 211 included in one processor element 121 for carry computation of the plural processor elements 121 for carry computation and an input of an adder (accumulative adder or computing unit) 211 included in another processor element 121 for carry computation. The extra data network 122 selects outputs of the plural processor elements 121 for carry computation and performs outputting.

As described above, the processor element 111 and the plural processor elements 121 for carry computation are connected via the carry network 120. As for the processor elements 121 for carry computation of the same bit number, any one is selected by the selector 1002 in the extra data network 122, and accumulatively added data of the selected one is outputted. Carry data CA outputted by the processor element 111 and carry data CA outputted by the plural processor elements 121 for carry computation are connected to the carry network 1004 of another bit accuracy via the carry network 120. The plural processor elements 121 for carry computation are connected also to the carry network 1004.

Figure 11:
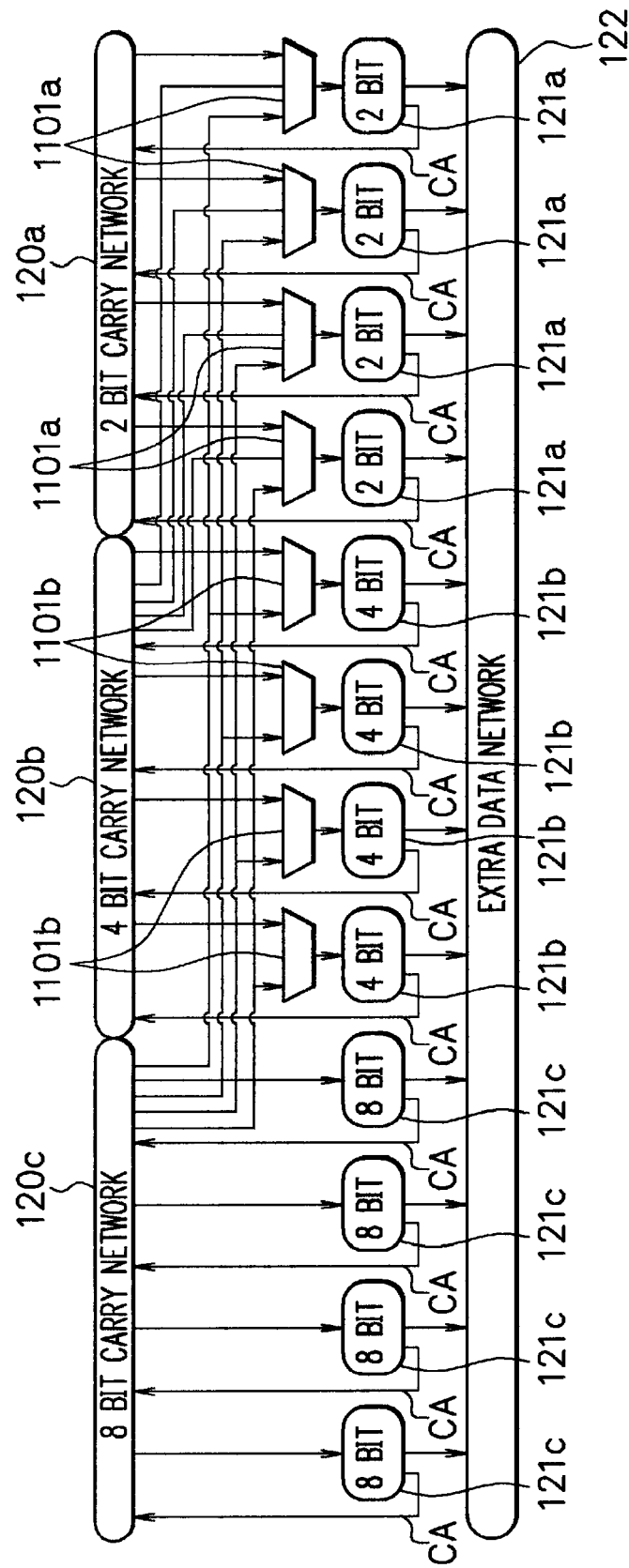
FIG. 11 is a diagram illustrating a configuration example of a processor element for carry computation, the processor element being connected to a plurality of carry networks.
Figure 12:
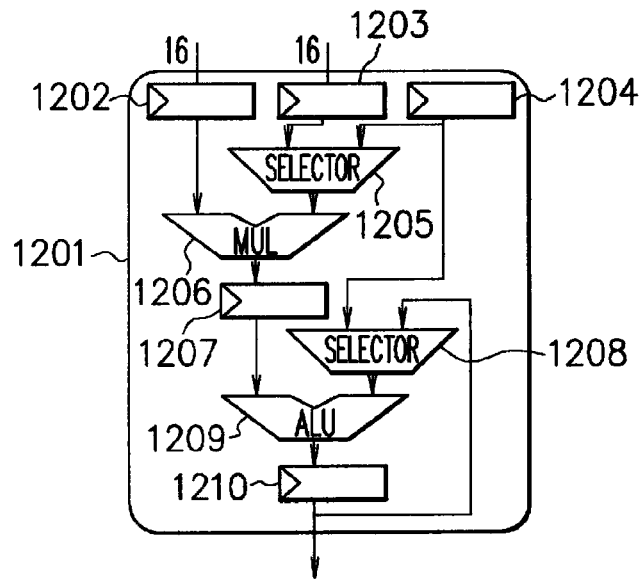
FIG. 12 is a diagram illustrating a configuration example of a processor element of a two-stage pipeline.
Figure 13:
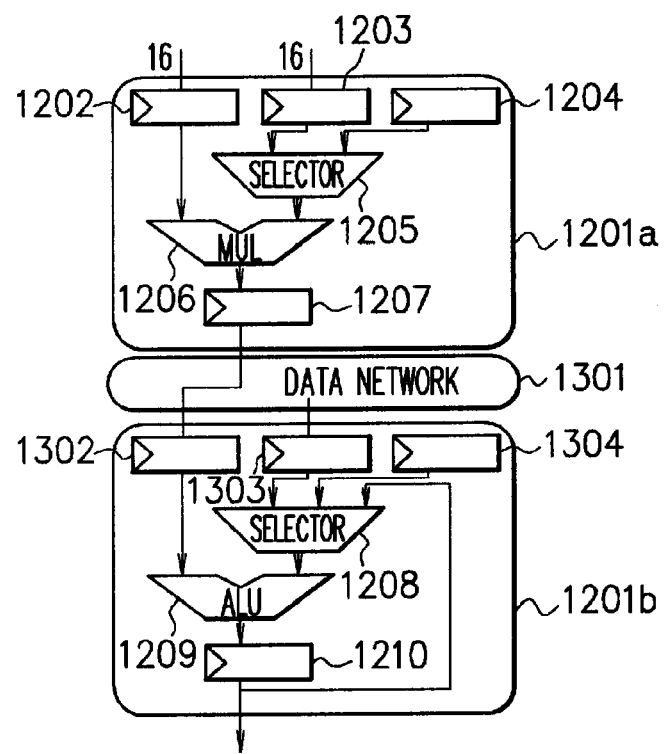
FIG. 13 is a diagram illustrating a configuration example of a reconfigurable circuit using two processor elements.

FIG. 11 is a diagram illustrating a configuration example of a processor element for carry computation connected to a plurality of carry networks. A carry network 120 is divided into a 2-bit carry network 120*a*, a 4-bit carry network 120*b*, and an 8-bit carry network 120*c*. The carry networks 120*a* to 120*c* are provided with carry data CA outputted by a plurality of processor elements 111. There is described an example in which, with a processor element 121*c* for 8-bit carry computation, a processor element 121*b* for 4-bit carry computation, and a processor element 121*a* for 2-bit carry computation being a set, four sets of processor elements 121*a* to 121*c* for carry computation are connected correspondingly, for example, to four processor elements 111.

The four processor elements 121*c* for 8-bit carry computation input carry data CA outputted by the processor elements 111 of respective sets from the 8-bit carry network 120*c* and perform accumulative addition, outputting 8-bit accumulatively added data to an extra data network 122 and outputting 1-bit carry data CA to the 8-bit carry network 120*c*.

Four selectors 1101*b* input the carry data CA outputted by the processor elements 121*c* for 8-bit carry computation of the respective sets via the 8-bit carry network 120*c* respectively, input carry data CA outputted by the processor elements 111 of the respective sets via the 4-bit carry network 120*b*, and select any one of the above, outputting to the four processor elements 121*b* for 4-bit carry computation. The four processor elements 121*b* for 4-bit carry computation input carry data CA outputted by selectors 1101*b* respectively and perform accumulative addition, outputting 4-bit accumulatively added data to the extra data network 122 and outputting 1-bit carry data CA to the 4-bit carry network 120*b*.

Four selectors 1101*a* input the carry data CA outputted by the processor elements 121*c* for 8-bit carry computation of the respective sets via the 8-bit carry network 120*c* respectively, input the carry data CA outputted by the processor element 121*b* for 4-bit carry computation of the respective sets via the 4-bit carry network 120*b*, input carry data CA outputted by the processor elements 111 of the respective sets via the 2-bit carry network 120*a*, and then select any one of the above, outputting to the four processor elements 121*a* for 2-bit carry computation. The four 2-bit processor elements 121*a* for 2-bit carry computation input carry data CA outputted by the selectors 1101*a* respectively and perform accumulative addition, outputting 2-bit accumulatively added data to the extra data network 122 and outputting 1-bit carry data CA to the 2-bit carry network 120*a*.

As described above, the four sets of processor elements 121*a* to 121*c* for carry computation are provided in correspondence with the four processor elements 111. Thereby, the four sets of processor elements 121*a* to 121*c* for carry computation can accumulatively add the carry data CA of the four processor elements 111, so that bit accuracy can be improved.

In the processor element 111, carry data occurs due to accumulative addition and/or multiply-and-accumulation. Since the processor elements 121*a* to 121*c* for carry computation accumulatively add the carry data, bit accuracy of the computation can be improved.

Figure 14:
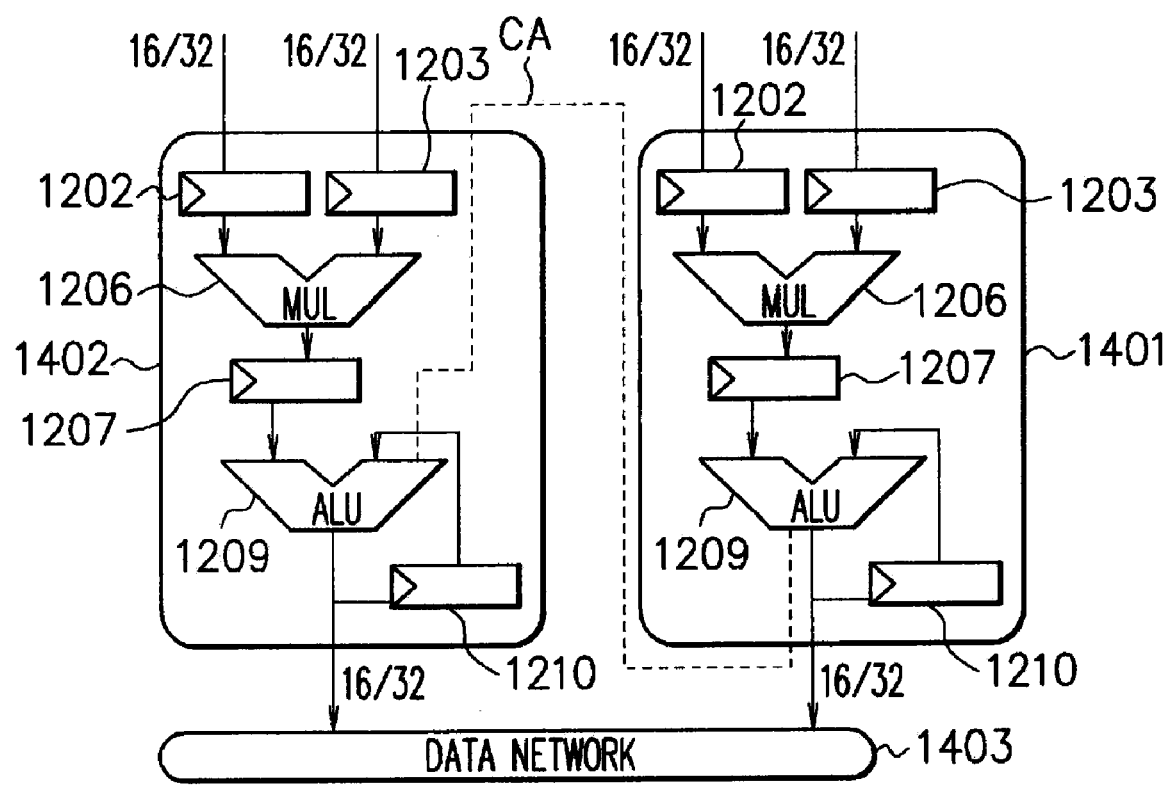
FIG. 14 is a diagram illustrating a configuration example of a reconfigurable circuit in which bit accuracy is improved by using two processor elements.

The processor elements 121*a* to 121*c* for carry computation are accumulative adders, and do not have an additional adder 1206, registers 1202, 1203, 1207 or the like unsimilarly to the processor element 1402 in FIG. 14. Thus, it is possible to prevent occurrence of a wasteful resource and to improve usage efficiency of the resource.

In a reconfigurable LSI of 16/32-bit architecture, there is used a processor element 121 for carry computation in which the bit number is reduced from that of the processor element 111. It is configured so that the processor element 121 for carry computation can be connected to a plurality of processor elements 111. It is possible to respond various usages and bit accuracy by switching connection of the processor elements 121 for 2-bit/4-bit/8-bit carry computation. It is possible to realize an accumulative addition circuit with further minute accuracy by making the inside of the processor element 111 be SIMD (Single Instruction Multiple Data). Further, since the processor element 121 for carry computation has a small bit number, a circuit size can be made small. It is also possible to make a circuit size small and to reduce the number of registers by using only carry data CA as an external input in the processor element 121 for carry computation.

It should be noted that 4-bit carry computation may be performed by using two processor elements 121*a* for 2-bit carry computation. Further, 6-bit carry computation may be performed by using a processor element 121*a* for 2-bit carry computation and a processor element 121*b* for 4-bit carry computation. Further, 8-bit carry computation may be performed by using two processor elements 121*b* for 4-bit carry computation. Furthermore, 10-bit carry computation may be performed by using one processor element 121*a* for 2-bit carry computation and two processor elements 121*b* for 4-bit carry computation. By constitutions as described above, carry computation of from 2 bits to 16 bits can be performed.

In a case of a constitution with only processor elements 121*a* for 2-bit carry computation, a plurality of processor elements 121*a* for 2-bit computation are combined, whereby a multiple bit constitution such as a 4-bit constitution or 8-bit constitution can be realized.

In a case of a constitution with only processor elements 121*b* for 4-bit carry computation, two or three processor elements 121*b* for 4-bit computation are combined, whereby a multiple bit constitution of 8 bits to 12 bits can be realized.

Data of 16/32 bits or more can be realized by connecting an output of a processor element 121 for carry computation to an extra data network 122.

It is possible to perform accumulative addition or multiply-and-accumulation in a first logic block and to perform carry computation in a second logic block. Thereby, it is possible to improve bit accuracy and to prevent occurrence of a wasteful resource, so that usage efficiency of the resource can be improved.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A semiconductor integrated circuit comprising:
    a plurality of first logic blocks which are reconfigurable, the plurality of first logic blocks to input data of a first bit width and perform computation;
    a first network to connect the plurality of first logic blocks in a dynamically reconfigurable manner;
    a plurality of second logic blocks to input data of a second bit width different from the first bit width and perform computation;
    a second network connected to outputs of the plurality of second logic blocks; and
    a third network to connect a carry bit output of a computing unit included in the first logic block to an input of a computing unit included in the second logic block in a dynamically reconfigurable manner,
    wherein the third network connects a carry bit output of a computing unit included in one second logic block of the plurality of second logic blocks to an input of a computing unit included in another second logic block.

2. The semiconductor integrated circuit according to claim 1, wherein the computing unit included in the second logic block is an adder.

3. The semiconductor integrated circuit according to claim 1, wherein a bit width of output data of the second logic block is half, ¼ or ⅛ of a bit width of output data of the first logic block.

4. The semiconductor integrated circuit according to claim 1, wherein the computing unit included in the first logic block is an accumulative adder.

5. The semiconductor integrated circuit according to claim 1, wherein the first bit width is 16 bits or 32 bits.

6. The semiconductor integrated circuit according to claim 1, wherein the second network selects and outputs the outputs of the plurality of second logic blocks.

7. The semiconductor integrated circuit according to claim 1, wherein the second bit width is 1 bit.

8. The semiconductor integrated circuit according to claim 1, wherein the second logic block is an accumulative adder.

9. The semiconductor integrated circuit according to claim 1, wherein the plurality of second logic blocks comprise second logic blocks to output 2-bit, 4-bit and 8-bit data respectively.

* * * * *

UNITED STATES PATENT AND TRADEMARK OFFICE
CERTIFICATE OF CORRECTION

PATENT NO. : 8,352,533 B2
APPLICATION NO. : 12/332673
DATED : January 8, 2013
INVENTOR(S) : Hiroshi Furukawa Page 1 of 1

It is certified that error appears in the above-identified patent and that said Letters Patent is hereby corrected as shown below:

On the Title Page Item (54) and in the specifications, Column 1, the Title should read:

-- SEMICONDUCTOR INTEGRATED CIRCUIT IN A CARRY COMPUTATION NETWORK HAVING A LOGIC BLOCKS WHICH ARE DYNAMICALLY RECONFIGURABLE --

Signed and Sealed this
Twenty-eighth Day of May, 2013

Teresa Stanek Rea
*Acting Director of the United States Patent and Trademark Office*